(12) United States Patent
Ishida

(10) Patent No.: US 12,727,703 B2
(45) Date of Patent: Sep. 8, 2026

(54) ELECTRIC KETTLE

(71) Applicant: KALITA CO., LTD., Kanagawa (JP)

(72) Inventor: Ichiro Ishida, Kanagawa (JP)

(73) Assignee: KALITA CO., LTD., Kanagawa (JP)

( * ) Notice: Subject to any disclaimer, the term of this patent is extended or adjusted under 35 U.S.C. 154(b) by 576 days.

(21) Appl. No.: 18/226,320

(22) Filed: Jul. 26, 2023

(65) Prior Publication Data

US 2023/0363567 A1 Nov. 16, 2023

Related U.S. Application Data

(63) Continuation of application No. PCT/JP2022/002631, filed on Jan. 25, 2022.

(30) Foreign Application Priority Data

Jan. 29, 2021 (JP) ................................ 2021-013711

(51) Int. Cl.
*A47J 27/21* (2006.01)

(52) U.S. Cl.
CPC ..... *A47J 27/2105* (2013.01); *A47J 27/21016* (2013.01); *A47J 27/21191* (2013.01)

(58) Field of Classification Search
CPC .............. A47J 27/2105; A47J 27/21016; A47J 27/21191; A47J 27/21
See application file for complete search history.

(56) References Cited

FOREIGN PATENT DOCUMENTS

| | | | |
|---|---|---|---|
| CN | 211722781 | U | 10/2020 |
| CN | 212140171 | U | 12/2020 |
| JP | H4-312414 | A | 11/1992 |
| JP | H5-074421 | U | 10/1993 |
| JP | 2010-131234 | A | 6/2010 |
| JP | 2017-000231 | A | 1/2017 |
| JP | 2021-177840 | A | 11/2021 |

OTHER PUBLICATIONS

International Search Report issued in PCT/JP2022/002631 mailed on Mar. 15, 2022 with English Translation (5 pages).
Written Opinion of International Searching Authority issued in PCT/JP2022/002631 mailed on Mar. 15, 2022 with English Translation (8 pages).

*Primary Examiner* — Robert G Bachner
(74) *Attorney, Agent, or Firm* — Nakanishi IP Associates, LLC

(57) ABSTRACT

An electric kettle includes a power supply base, and a kettle main body to be removably mounted on the power supply base. The kettle main body has: a container having a bottomed cylindrical shape that contains a liquid; a nozzle provided in a lower part of a side surface of the container; and a valve mechanism that opens and closes a flow channel for the liquid from the container to the nozzle.

5 Claims, 9 Drawing Sheets

53
52
54
511
60
62
63
64
66
57
57a
51
67

53
52
54
511
60
62
63
64
66
57
57a
51
67

ELECTRIC KETTLE

TECHNICAL FIELD

The present invention relates to an electric kettle.

BACKGROUND ART

Electric kettles are well known, which are used in dining rooms, kitchens or other areas of households. The electric kettle includes a power supply base and a kettle main body, the power supply base is shaped to be suitably mounted on a table or the like, and the kettle main body is removably attached to the power supply base. When the kettle main body is mounted on the power supply base, a heater in the container is driven by electric power supplied from the power supply base and thereby can boil the water in the container.

With such an electric kettle, a steam channel for discharging steam produced in the container to the outside is formed in the lid of the kettle main body, in order to reduce the pressure in the container raised when the water is boiling or in order to prevent the water (hot water) from being hard to pour from the nozzle because of the negative pressure in the kettle. The kettle main body is also provided with a spout for pouring the liquid in the kettle main body.

It is desired to prevent the liquid in the kettle main body from leaking to the outside when the kettle main body falls on its side, in order to reduce the risk of burns on the user. For example, Patent Literature 1 discloses an electric kettle having a steam channel that has a water stop function to prevent the liquid in the kettle main body from leaking through the steam channel.

Some kettles have a wide spout for quick pouring provided in an upper part of the kettle main body, while others have a narrow nozzle provided in a lower part of the kettle main body for pour-over coffee brewing. The electric kettle having a nozzle provided in a lower part of the kettle main body does not have a sufficient space around the base end of the nozzle compared with the electric kettle having a spout provided in an upper part of the kettle main body. Nevertheless, it is desired to prevent the liquid in the kettle main body from leaking from the spout when the kettle main body falls on its side.

CITATION LIST

Patent Literature

Patent Literature 1: Japanese Patent Laid-Open No. 2010-131234

SUMMARY

Technical Problem

With an electric kettle having a narrow nozzle provided in a lower part of a kettle main body, it is desired to reduce the amount of liquid leaking from the nozzle when the kettle main body falls on its side.

Solution to Problem

An electric kettle according to an embodiment includes a power supply base, and a kettle main body to be removably mounted on the power supply base. The kettle main body has a container having a bottomed cylindrical shape that contains a liquid, a nozzle provided in a lower part of a side surface of the container, and a valve mechanism that opens and closes a flow channel for the liquid from the container to the nozzle.

Advantageous Effects of Invention

According to the present invention, in an electric kettle having a narrow nozzle provided in a lower part of a kettle main body, the amount of liquid in the kettle main body leaking from the nozzle when the kettle main body falls on its side can be reduced.

BRIEF DESCRIPTION OF THE VIEWS OF THE DRAWING

FIG. 8 is a perspective view showing the valve mechanism in FIG. 2 turned on.

FIG. 9 is a cross-sectional view showing the valve mechanism in FIG. 2 turned on.

DETAILED DESCRIPTION

In the following, an electric kettle according to an embodiment will be described with reference to FIGS. 1 to 9.

Figure 1:
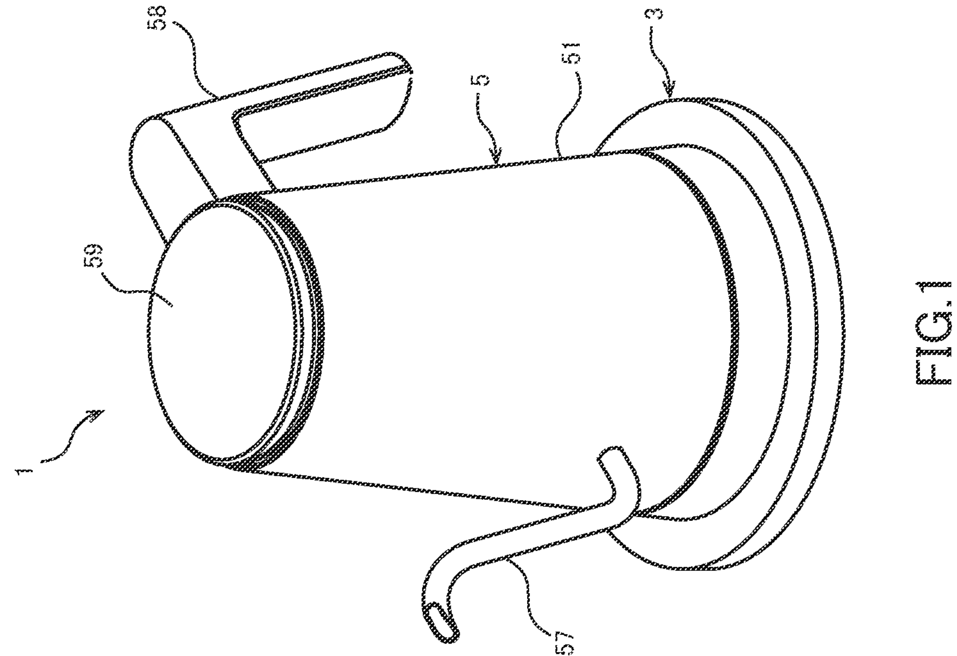
FIG. 1 is a perspective view showing a general appearance of an electric kettle according to an embodiment of the present invention.

As shown in FIG. 1, an electric kettle 1 includes a power supply base 3 to be placed on a table or the like and a kettle main body 5 to be removably attached to the power supply base 3.

The kettle main body 5 has an armor case 51 having a bottomed cylindrical shape. Typically, the armor case 51 has the shape of a truncated cone that decreases in diameter from the bottom to the top. A lid 59 that covers the opening at the top of the armor case 51 is attached to the top of the armor case 51 in an openable manner. A narrow cylindrical nozzle 57 is attached to a front lower part of the armor case 51. Although the nozzle 57 can have any shape, the nozzle 57 typically has a gently curved shape so that a spout 57*b* at the tip end of the nozzle 57 is located forward of and higher than a rear end (base end) 57*a* of the nozzle 57 attached to the armor case 51. A handle 58 is attached to a rear upper part of the armor case 51.

Figure 2:
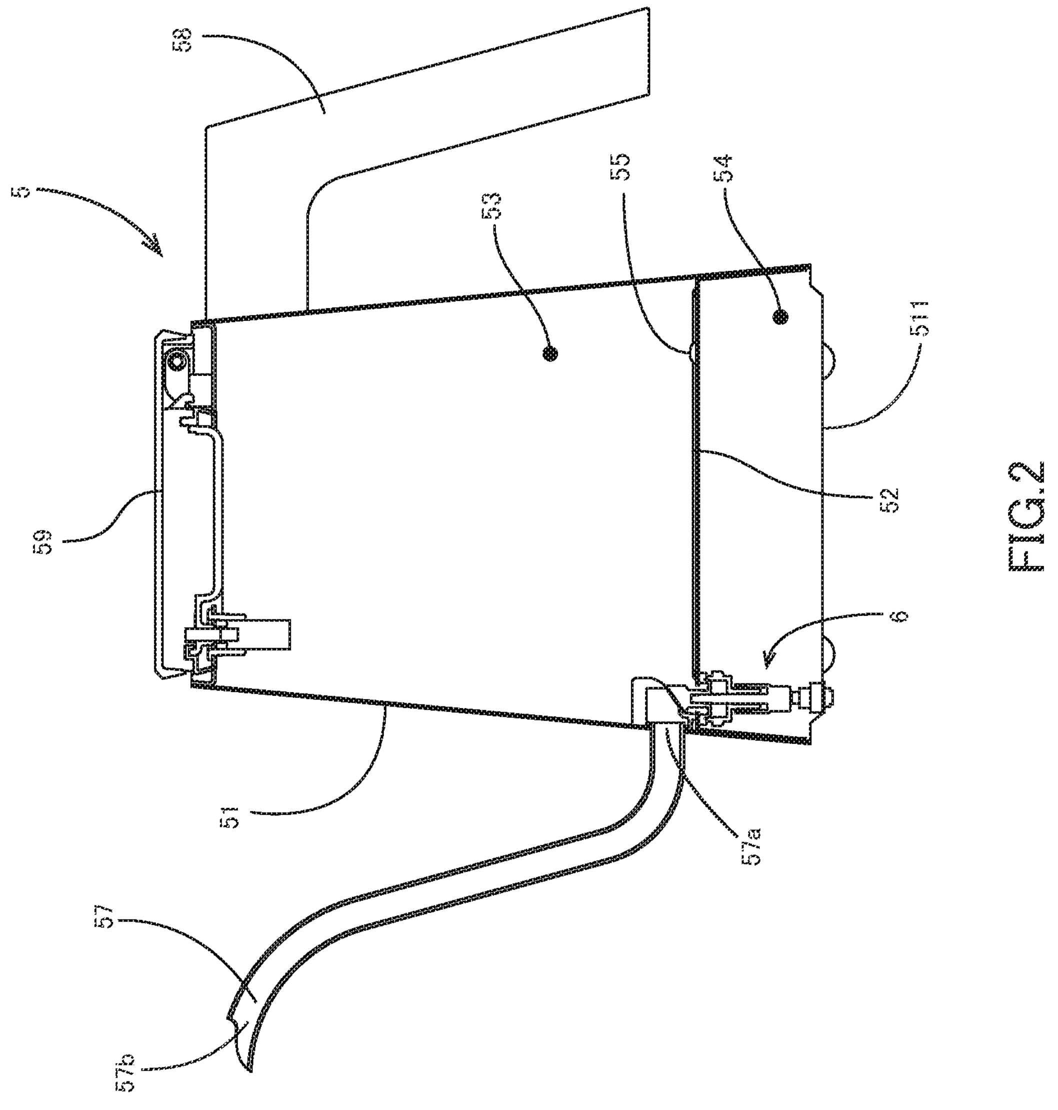
FIG. 2 is a cross-sectional view showing an internal structure of a kettle main body in FIG. 1.

As shown in FIG. 2, in the armor case 51, a horizontal partition plate 52 is provided to vertically divide the inner space of the armor case 51. The partition plate 52 is disposed below the base end 57*a* of the nozzle 57 on the armor case 51. An upper space of the inner space of the armor case 51 divided by the partition plate 52 serves as a container that contains a liquid such as water, and a lower space serves as a housing part that houses a control board, a cable or the like.

In the description below, the upper part and the lower part of the kettle main body 5 defined by the armor case 51 and the partition plate 52 are referred to as a container 53 and a housing part 54, respectively, for differentiation.

A heater 55 for heating the liquid contained in the container 53 is attached to the partition plate 52. The heater 55 is connected to an electrical connection terminal (not shown) provided on an outer surface of a bottom part 511 of the armor case 51 by a cable. The cable is routed in the housing part 54.

The kettle main body 5 is not limited to the configuration described above, as far as the nozzle 57 is attached to the bottom part of the kettle main body 5. For example, although the upper part of the trunk part of the armor case 51 is also the trunk part of the container 53 in this embodiment, the armor case 51 and the container 53 may be separate components. In that case, the kettle main body 5 may have the armor case 51 made of a rigid resin and a container made of stainless steel having a bottomed cylindrical shape that is smaller than and housed in the armor case 51. In addition, as far as the opening at the top of the container 53 can be covered, the lid 59 may be configured to be removable from the container 53, for example. In addition, as far as the kettle main body 5 can be lifted, the position of the handle 58 attached to the kettle main body 5 is not limited to the rear upper part of the armor case 51. In addition, as far as the liquid contained in the container 53 can be heated, the heater 55 can be attached to any part. Of course, the armor case 51 can have a cylindrical, rectangular cylindrical or other shape.

(Valve Mechanism 6)

One characteristic of the electric kettle 1 according to this embodiment is that the electric kettle 1 has a valve mechanism 6 that opens and closes a flow channel for a liquid flowing from the container 53 into the nozzle 57. When the flow channel is not closed by the valve mechanism 6, that is, when the flow channel is open, the user can pour the liquid from the spout 57*b* of the nozzle 57 by tilting the kettle main body 5 forward, as with the conventional electric kettles. On the other hand, when the flow channel is closed by the valve mechanism 6, the amount of the liquid flowing out of the spout 57*b* of the nozzle 57 when the kettle main body 5 is accidentally tilted, such as when the kettle main body 5 falls on its side, can be substantially reduced compared with a kettle main body 5 without the valve mechanism 6.

Typically, the valve mechanism 6 is configured as described below.

(Water Channel 60)

Figure 3:
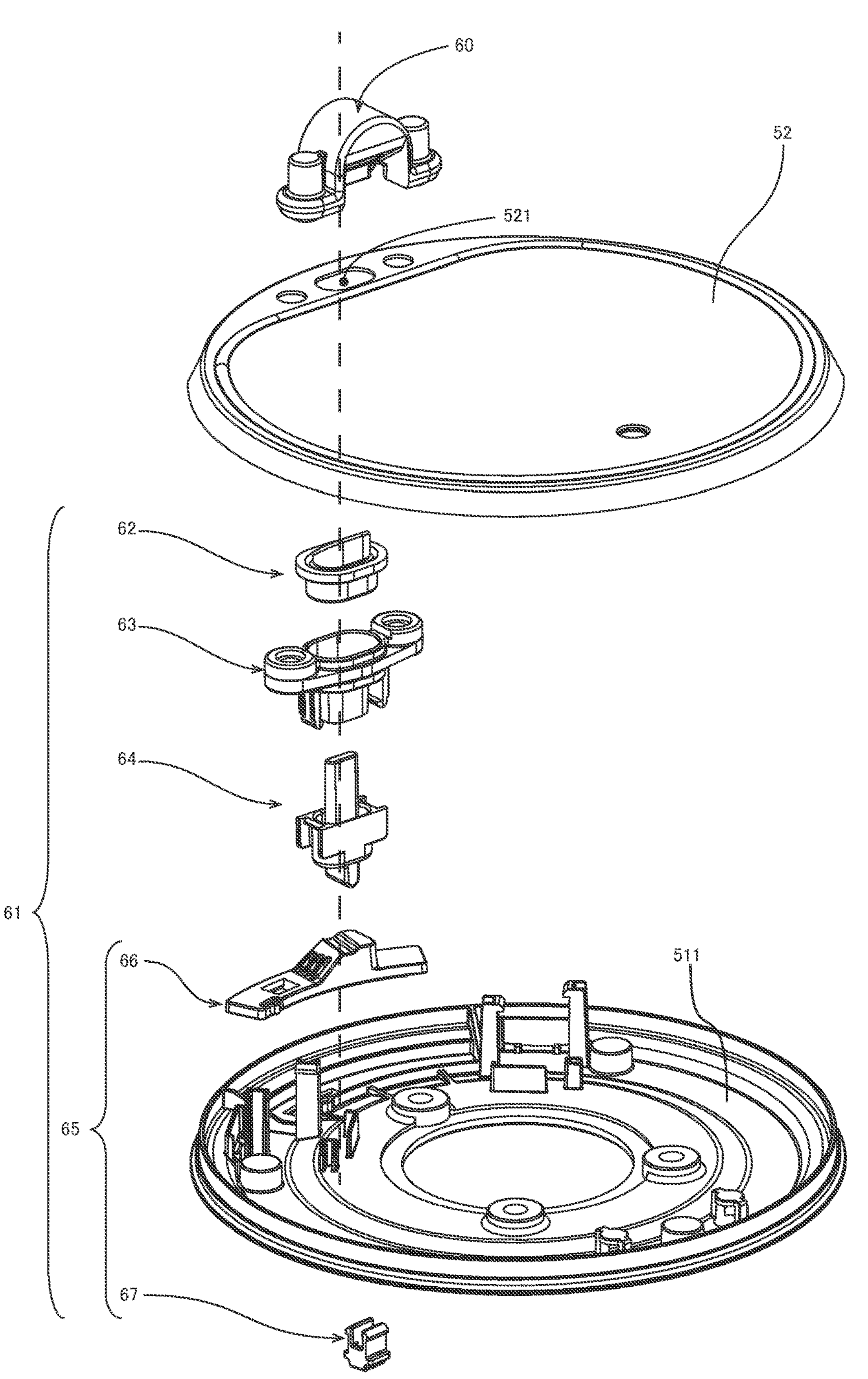
FIG. 3 is an exploded perspective view showing a valve mechanism in FIG. 2.

As shown in FIGS. 2 and 3, the valve mechanism 6 has a water channel 60 that defines the flow channel for the liquid flowing from the container 53 into the nozzle 57. The water channel 60 is configured as an L-shaped cylinder, one end of the water channel 60 is connected to the nozzle 57, and the opening at the other end of the water channel 60 faces downward. The liquid contained in the container 53 always flows into the nozzle 57 through the water channel 60. Therefore, by closing the opening at the other end of the water channel 60 or blocking the water channel 60 in the middle, the liquid in the container 53 can be prevented from flowing into the nozzle 57. In the following, the opening at the other end of the water channel 60 will be referred to simply as an opening of the water channel 60. In order to facilitate introducing the liquid in the kettle main body 5 into the water channel 60, the opening plane of the opening of the water channel 60 is preferably tilted at an angle greater than 0 degrees and smaller than 90 degrees, typically 45 degrees, with respect to the vertical direction of the kettle main body 5. If the opening plane of the opening of the water channel 60 is tilted, the pressure of the liquid in the container 53 can also be used when a valve body 62 described later closes the opening of the water channel 60, so that the opening of the water channel 60 can be more tightly closed by the valve body 2.

(Opening/Closing Mechanism 61)

As shown in FIG. 3, the valve mechanism 6 has an opening/closing mechanism 61 that opens and closes the opening of the water channel 60. The opening/closing mechanism 61 has the valve body 62 that closes the opening of the water channel 60, a supporting member 63 that supports the valve body 62, a valve stem 64 that pushes the valve body 62 in a direction from an open position in which the opening of the water channel 60 is opened to a closed position in which the opening of the water channel 60 is closed, and a drive mechanism 65 that drives a pushing operation of the valve stem 64 to push the valve body 62. In the kettle main body 5, the open position is located below the closed position. The direction from the open position to the closed position is defined as an upward direction, and the direction from the closed position to the open position is defined as a downward direction.

The opening/closing mechanism 61 is housed in the housing part 54 of the armor case 51. A through-hole 521 is formed in the partition plate 52 at a position opposed to the opening of the water channel 60. The through-hole 521 serves as an outlet/inlet port into and out of which a part of the valve body 62 of the opening/closing mechanism 61 comes.

(Valve Body 62)

The valve body 62 is provided to close the through-hole 521 formed in the partition plate 52 from the side of the housing part 54 of the armor case 51. In this way, the liquid filling the container 53 can be prevented from flowing into the housing part 54 through the through-hole 521 formed in the partition plate 52. That the valve body 62 doubles as a sealing member that prevents the liquid from flowing into the housing part 54 in this way is one characteristic of the electric kettle 1 according to this embodiment. The valve body 62 serving also as a sealing member contributes to reducing the cost of parts and facilitating the assembly operation because of the reduced number of parts.

Figure 4:
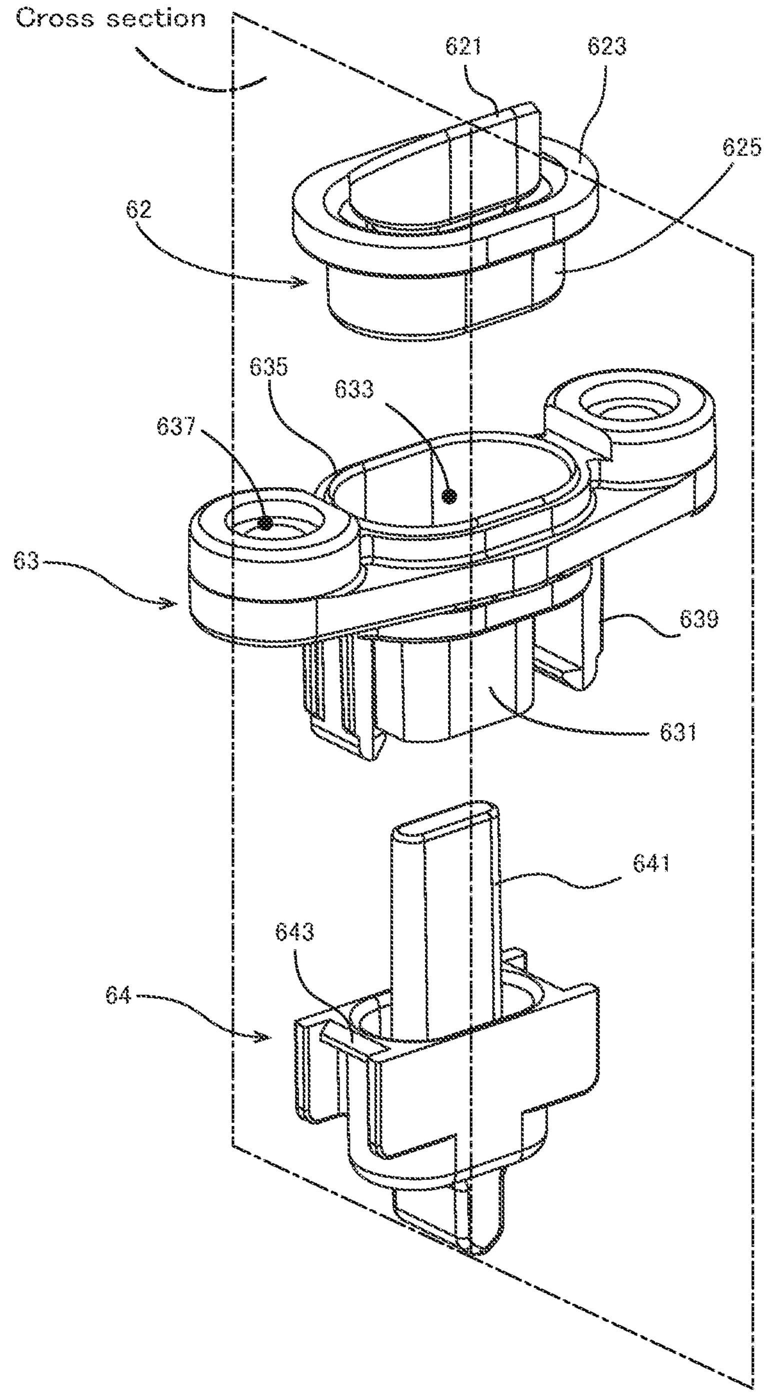
FIG. 4 is a perspective view showing a valve body, a supporting member and a valve stem in FIG. 3.
Figure 5:
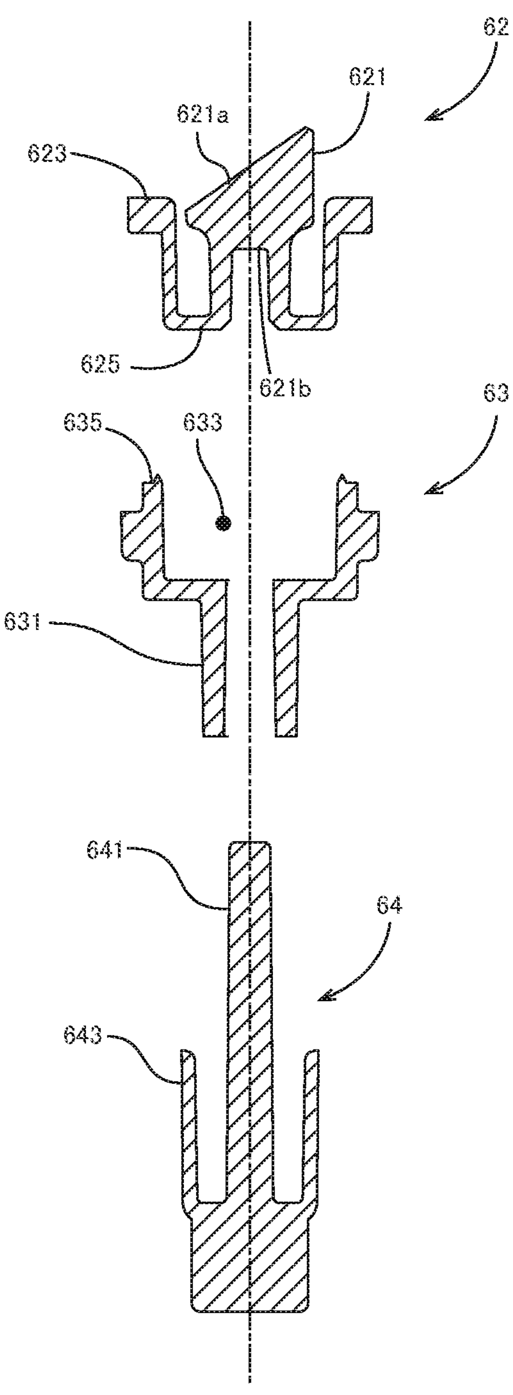
FIG. 5 is a longitudinal cross-sectional view of the valve body, the supporting member and the valve stem taken along the cutting plane in FIG. 4.

Specifically, the valve body 62 is configured as described below. The valve body 62 is made of an elastomeric resin so that the valve body 62 is elastically deformed. As shown in FIGS. 4 and 5, the valve body 62 is formed by a main body part 621 that has a cylindrical shape, a sealing part 623 that has an annular shape and is disposed around the main body part 621, and a coupling part 625 that has a grooved frame shape and couples the main body part 621 and the sealing part 623 to each other. The valve body 62 has a substantially W-shaped cross section as a whole. The main body part 621 is a central part located at the center of the valve body 62, and the sealing part 623 is a peripheral part located on the periphery of the valve body 62. The main body part 621 has a smaller size in plan view than the through-hole 521 formed in the partition plate 52 so that the main body part 621 can come into and out of the through-hole 521. A tip end 621*a* of the main body part 621 has a tilted surface that is parallel to the tilted plane of the opening of the water channel 60 so that the tip end 621*a* can come into intimate contact with the opening of the water channel 60. A rear end 621*b* of the main body part 621 has a horizontal surface that is perpendicular to the vertical direction of the kettle main body 5 so that the tip end of the valve stem 64 can easily abut against the rear end 621*b*. Of course, the shape of the tip end 621*a* of the main body part 621 is not limited to the shape described above, as far as the tip end 621*a* can close the opening of the water channel 60.

The valve body 62 is fixed to a back surface of the partition plate 52 by the sealing part 623 at the periphery thereof being pressed against the back surface of the partition plate 52 by the supporting member 63 described later. In the state where the valve body 62 is fixed to the partition plate 52, when the valve stem 64 pushes the main body part 621 upward, the valve body 62 is elastically deformed. Specifically, the main body part 621 and the sealing part 623 are not elastically deformed, and the coupling part 625 is elastically deformed to push the main body part 621 to the closed position in which the opening of the water channel 60 is closed, bring the tip end 621*a* into intimate contact with the opening of the water channel 60 and thereby close the opening of the water channel 60. When the pushing of the main body part 621 by the valve stem 64 is released, the main body part 621 is returned to the position before the pushing by the restoring force of the entire valve body 62, and thus the opening of the water channel 60 is opened.

The valve body 62 is preferably configured so that the coupling part 625 is thinner than the main body part 621 and the sealing part 623. If the coupling part 625 is thinner and more susceptible to elastic deformation than the main body part 621 and the sealing part 623, the main body part 621 can be pushed to the closed position without causing significant elastic deformation of the main body part 621 and the sealing part 623 while the coupling part 625 is elastically deformed. Since the main body part 621 and the sealing part 623 are not significantly elastically deformed by the pushing of the main body part 621 by the valve stem 64, formation of a gap is prevented between the main body part 621 and the opening of the water channel 60 to reduce the deterioration of the ability of the main body part 621 to close the opening of the water channel 60, and formation of a gap is prevented between the sealing part 623 and the partition plate 52 and between the sealing part 623 and the supporting member 63. In this way, deterioration of the sealing performance can be reduced.

(Supporting Member 63 and Valve Stem 64)

The supporting member 63 is made of a rigid resin, for example, so that the supporting member 63 is not elastically deformed. For the sake of its functionality, the supporting member 63 has a supporting part that supports the valve body 62, a guide part that guides movement of the valve stem 64, and an attachment part for attaching the supporting member 63 to the partition plate 52. In practice, the supporting member 63 has a main body part 631 having a cylindrical shape having an inner diameter that allows passage of the stem part of the valve stem 64. The main body part 631 itself serves as a guide part, and the supporting member 63 allows the valve stem 64 to smoothly move in the vertical direction. A recess 633 into which the valve body 62 is to be fitted is formed in a tip end of the main body part 631. The recess 633 serves as the supporting part. A projection 635 at which the valve body 62 is pressed against the partition plate 52 is formed on the tip end of the main body part 631. A pair of arms is provided on an outer circumference of the main body part 631, and the arm has an attachment hole 637 into which a fastener, such as a bolt or a screw, can be inserted. The attachment hole 637 serves as the attachment part. The supporting member 63 is provided with a pair of claws 639 that prevents a stem part 641 of the valve stem 64 inserted in the main body part 631 from dropping off from the main body part 631. The valve stem 64 has a pair of claws receiving parts 643 that receive the pair of claws 639 of the supporting member 63.

In the state where the valve body 62 is fitted in the recess 633 of the supporting member 63, the sealing part 623 of the valve body 62 rests on the tip end of the supporting member 63. In this state, the supporting member 63 is firmly fastened to the back surface of the partition plate 52 with the fastener, such as a bolt, inserted in the attachment hole 637 of the supporting member 63. Then, the sealing part 623 of the valve body 62 is pressed against the partition plate 52 by the projection 635 of the supporting member 63 so that the valve body 62 is fixed to the back surface of the partition plate 52, and thus, the valve body 62 serves as a sealing member that prevents the liquid from flowing into the housing part 54 of the armor case 51.

(Drive Mechanism 65)

The drive mechanism 65 has a manual operation part 67 for manually operating the upward movement of the valve stem 64. The manual operation part 67 serves as an operation part that turns on and off the valve mechanism 6. The manual operation part 67 is provided at the bottom part 511 of the armor case 51 so that the user can slide the manual operation part 67. The drive mechanism 65 has a conversion block 66 that converts the sliding movement of the manual operation part 67 into the upward movement of the valve stem 64. The conversion block 66 has a tilted surface 661 for pushing out the valve stem 64 and a locking surface 663 for locking the valve stem 64 pushed out. Typically, the conversion block 66 has the shape of a trapezoidal block coupled to a surface of a flat plate.

The manual operation part 67 provided at the bottom part 511 of the armor case 51 of the kettle main body 5 and the sliding operation of the manual operation part 67 have the advantages described below. In general, the kettle main body 5 is removed from the power supply base 3 only in use and returned to the power supply base 3 immediately after use. In the state where the kettle main body 5 is placed on the power supply base 3, the manual operation part 67 is not exposed on the surface of the kettle main body 5, and the kettle main body 5 always need to be removed from the power supply base 3 in order to operate the manual operation part 67. Children have higher risks of burns, and it is a hard task for children to remove the heavy kettle main body 5 containing liquid from the power supply base. Even if the kettle main body 5 can be successfully removed from the power supply base 3, children, who have weak muscle strength, can hardly operate the manual operation part 67 because the heavy kettle main body 5 need to be held by one hand in order to slide the manual operation part 67 provided at the bottom part 511 of the kettle main body 5. Once the kettle main body 5 is placed on the table, the manual operation part 67 cannot be operated. In addition, the manual operation part 67 cannot be turned on and off simply by hitting the bottom part 511 of the kettle main body 5 against something. That is, since the manual operation part 67 is not exposed on the surface of the kettle main body 5 in the state where the kettle main body 5 is placed on the power supply base 3, accidental operation of the manual operation part 67 can be reduced compared with the case where the manual operation part 67 is exposed. In addition, since the manual operation part 67 is operated by sliding rather than pressing, accidental operation of the manual operation part 67 can be prevented. When the kettle main body 5 contains no liquid, the kettle main body 5 is light and can be easily removed from the power supply base 3. In such a case, however, since only a little liquid is contained, even if the manual operation part 67 is operated and the valve mechanism 6 is turned off, the amount of the liquid leaking from the nozzle 57 is small, so that the risk of severe burns is quite low. Of course, the possibility that the manual operation part 67 is operated by pressing is not completely excluded, and the pressing operation may be adopted for the manual operation part 67 simply from the viewpoint of manually turning on and off the valve mechanism 6.

(Description of Operation of Valve Mechanism 6)

In the following, with reference to FIGS. 6 to 9, an operation of the valve mechanism 6 will be described. In FIGS. 7 and 9, the components of the valve mechanism 6 are indicated by hatching for differentiation from the other components.

Figure 6:
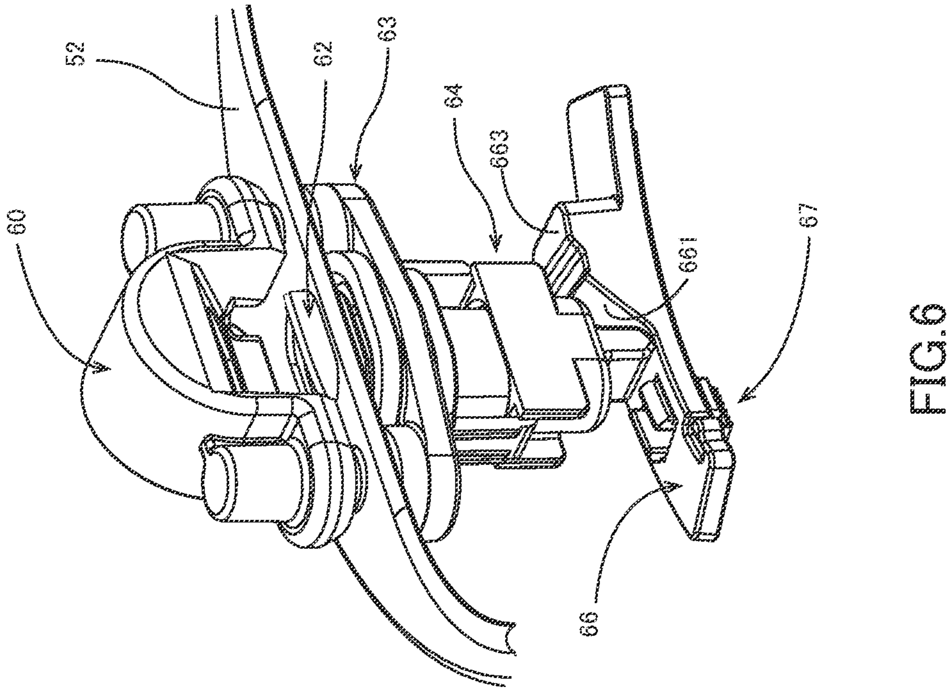
FIG. 6 is a perspective view showing the valve mechanism in FIG. 2 turned off.
Figure 7:
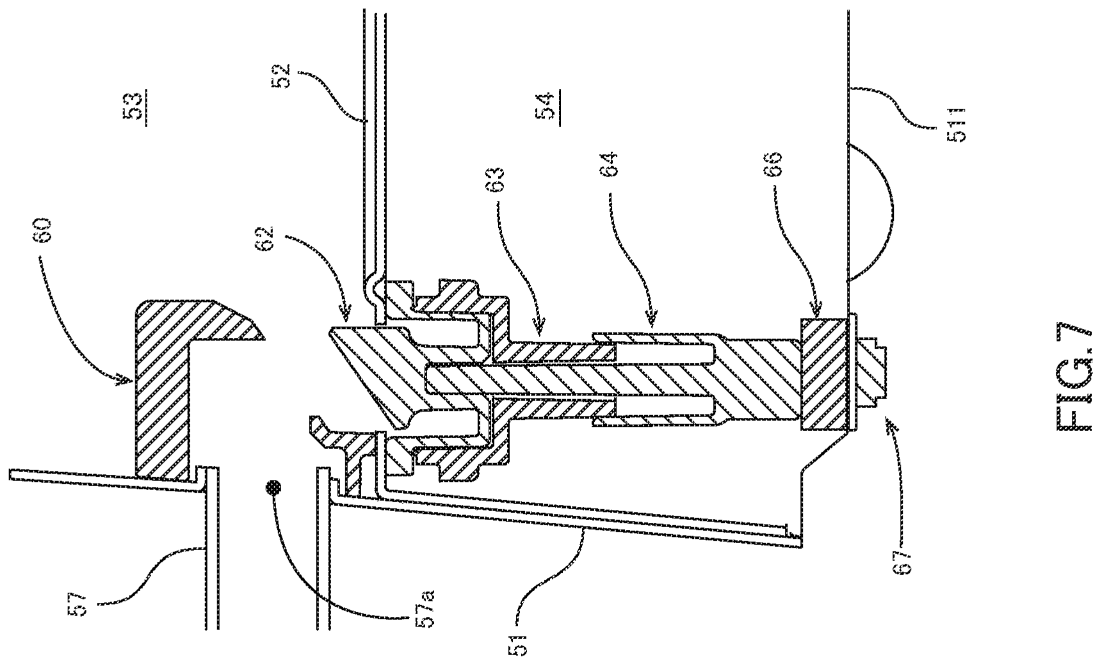
FIG. 7 is a cross-sectional view showing the valve mechanism in FIG. 2 turned off.

FIGS. 6 and 7 show the valve mechanism 6 turned off. The valve body 62 receives no pushing pressure from the valve stem 64, and the main body part 621 of the valve body 62 is disposed at the open position in which the opening of the water channel 60 is open. When the valve mechanism 6 is in the off state, the user can pour the liquid contained in the container 53 from the spout 57*b* of the nozzle 57 by tilting the kettle main body 5 forward.

Figure 8:
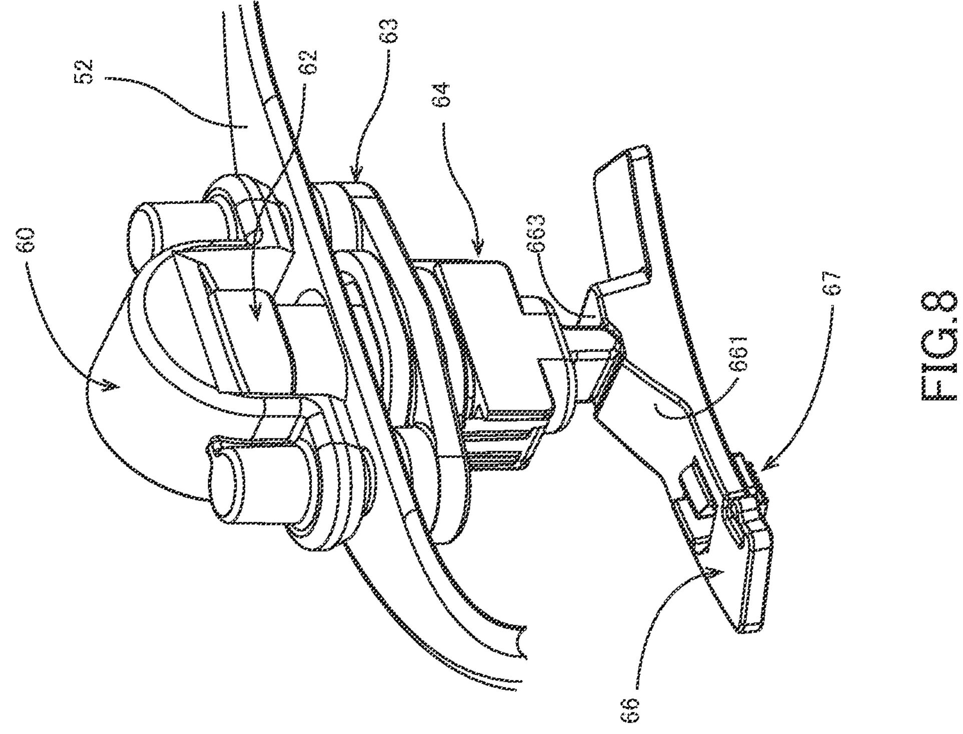
Figure 9:
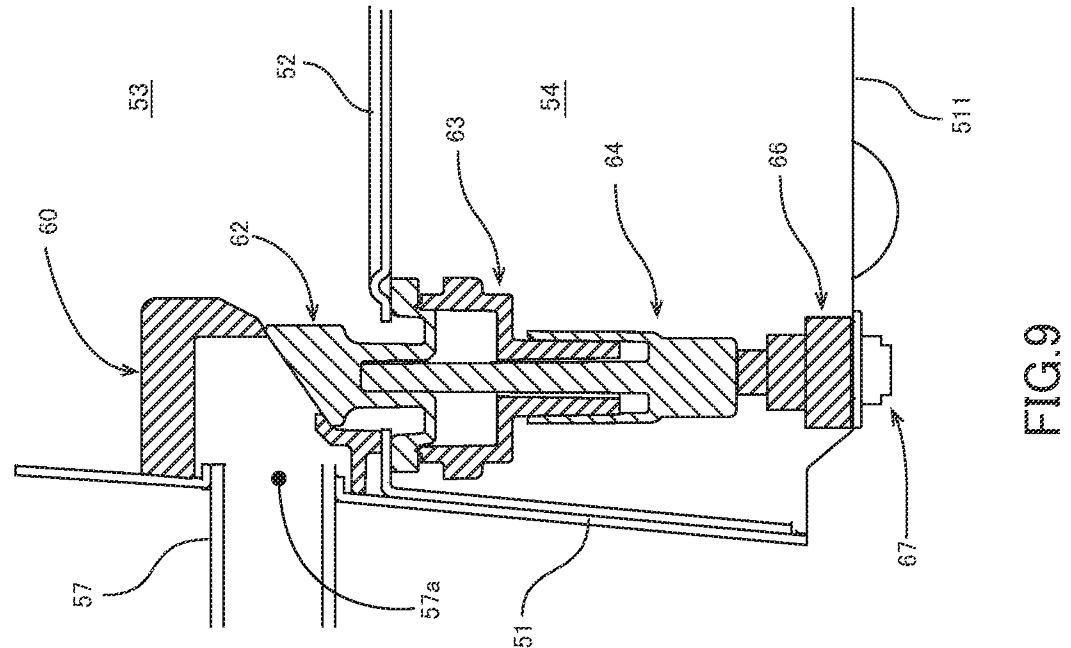

FIGS. 8 and 9 show the valve mechanism 6 turned on. When the manual operation part 67 is slid in a forward direction by the user, the conversion block 66 is slid in the forward direction, and the valve stem 64 is raised in the upward direction by the tilted surface 661 of the conversion block 66. As the valve stem 64 is raised in the upward direction, the tip end of the valve stem 64 pushes the main body part 621 of the valve body 62 in the upward direction, and, primarily due to the elastic deformation of the coupling part 625 of the valve body 62, the main body part 621 is moved to the closed position in which the opening of the water channel 60 is closed. The valve stem 64 presses the tip end 621*a* of the main body part 621 against the opening of the water channel 60, and the opening of the water channel 60 is closed by the main body part 621 of the valve body 62. The state where the opening of the water channel 60 is closed by the main body part 621 is maintained by the valve stem 64 being locked in the raised state by the locking surface 663 connected to the top of the tilted surface 661 of the conversion block 66. When the user slides the manual operation part 67 in a reverse direction, the conversion block 66 is slid in the reverse direction, and the locked state of the valve stem 64 by the conversion block 66 is released. The valve body 62 is released from the state where the valve body 62 is pressed by the valve stem 64, and the main body part 621 return to the open position in which the opening of the water channel 60 is open under the restoring force thereof.

The electric kettle 1 according to this embodiment described above is provided with the valve mechanism 6 that opens and closes the flow channel for the liquid from the container 53 to the nozzle 57. While the valve mechanism 6 is in the on state, even if the kettle main body 5 falls on its side, the amount of the liquid flowing out of the spout 57*b* of the nozzle 57 can be substantially reduced compared with an electric kettle without the valve mechanism 6.

In this embodiment, the opening/closing mechanism 61 is housed in the housing part 54 located below the container 53. However, simply from the viewpoint of opening and closing the opening of the water channel 60, the position of the opening/closing mechanism 61 is not limited to that described above. For example, the opening/closing mechanism 61 may be arranged in a horizontal position on the bottom of the container 53, and the opening of the water channel 60 may be opened and closed by the valve body 62 pushed in the horizontal direction (the direction parallel to the partition plate 52).

In this embodiment, the valve body 62 returns from the closed position to the open position under the restoring force thereof. However, a biasing member that biases the valve body 62 may be added to the opening/closing mechanism 61, as an auxiliary to the restoring force of the valve body 62 or in order to return the valve body 62 from the closed position to the open position without using the restoring force of the valve body 62. As the biasing member, a plate spring, a compression coil spring or a rubber may be used.

In this embodiment, the valve body 62 doubles as a sealing member. However, a sealing member separate from the valve body 62 may be added to the opening/closing mechanism 61.

In this embodiment, the drive mechanism 65 has the manual operation part 67. However, the drive mechanism 65 may be automatic, as far as the drive mechanism 65 can drive the upward movement of the valve stem 64. In that case, a motor that drives the upward and downward movement of the valve stem 64 and a control board that controls the motor and has a communication capability are housed in the housing part 54, and in response to an operation of a remote control by the user, the valve stem 64 can automatically move upward and downward to open and close the opening of the water channel 60.

The present invention is not limited to the embodiment described above, and in practice, various modifications can be made without departing from the spirit of the present invention. The embodiments may be combined as required, and in that case, the advantages are also combined. Furthermore, the embodiment described above includes various inventions, and various inventions can be derived depending on the combination of components selected from among the plurality of components disclosed. For example, if some components are omitted from all the components shown in the embodiment and the problem can still be solved and an advantage can still be achieved, the configuration without the omitted components can be derived as an invention.

REFERENCE SIGNS LIST

1 . . . electric kettle, 3 . . . power supply base, 5 . . . kettle main body, 51 . . . armor case, 511 . . . bottom part, 52 . . . partition plate, 53 . . . container, 54 . . . housing part, 55 . . . heater, 57 . . . nozzle, 57*a* . . . base end, 57*b* . . . tip end (spout), 58 . . . handle, 59 . . . lid, 6 . . . valve mechanism

The invention claimed is:

1. An electric kettle, comprising:

a power supply base; and a kettle main body to be removably mounted on the power supply base, wherein the kettle main body has:

a container having a bottomed cylindrical shape that contains a liquid;

a nozzle provided in a lower part of a side surface of the container; and a valve mechanism that opens and closes a flow channel for the liquid from the container to the nozzle, wherein the valve mechanism has:

a water channel having a cylindrical shape that defines the flow channel for the liquid from the container to the nozzle;

an opening/closing mechanism that opens and closes the water channel, the opening/closing mechanism having:

a valve body provided to be able to open and close the water channel;

a valve stem that pushes the valve body in a direction from an open position in which the water channel is open to a closed position in which the water channel is closed; and a drive mechanism that drives a pushing operation of the valve stem to push the valve body, and wherein:

the kettle main body has an armor case having a bottomed cylindrical shape that houses the container;

the opening/closing mechanism is housed in a space between a bottom plate of the armor case and a bottom plate of the container, and a hole, into and out of which the valve body comes, is formed in the bottom plate of the container; and the valve body is provided to close the hole from the side of the space and doubles as a sealing member that prevents the liquid from flowing into the space through the hole.

2. The electric kettle according to claim 1, wherein the valve body is elastically deformable, and when the valve body is pressed by the valve stem, the valve body is elastically deformed, and a part of the valve body is pushed from the open position to the closed position to close the water channel, and when the pressing by the valve stem is released, the part of the valve body returns from the closed position to the open position under a restoring force of the valve body to open the water channel.

3. The electric kettle according to claim 2, wherein the valve body has a substantially W-shaped cross section and has a peripheral part and a central part projecting upward and is fitted onto a back surface of the bottom plate of the container at the peripheral part, and the central part opens and closes the water channel.

4. The electric kettle according to claim 3, wherein a connection part that connects the peripheral part and the central part to each other is thinner than the peripheral part and the central part.

5. The electric kettle according to claim 1, wherein the drive mechanism further has a manual operation part for manually operating movement of the valve stem, and the manual operation part is provided on the bottom plate of the armor case.

* * * * *